United States Patent [19]
Shiga et al.

[11] Patent Number: 5,086,266
[45] Date of Patent: Feb. 4, 1992

[54] AUTOMOBILE AC GENERATOR SYSTEM

[75] Inventors: Naomichi Shiga; Hisatoshi Tsuchiya, both of Numazu; Yasuyuki Sakakibara, Fuji; Katsumi Kibe, Atami, all of Japan

[73] Assignee: Toyo Densan Co., Ltd., Numazu, Japan

[21] Appl. No.: 584,635

[22] Filed: Sep. 19, 1990

Related U.S. Application Data

[63] Continuation-in-part of Ser. No. 260,918, Oct. 21, 1988, Pat. No. 4,973,896.

[30] Foreign Application Priority Data

Sep. 19, 1989 [JP] Japan .................................. 1-240780

[51] Int. Cl.[5] .............................................. H02J 7/14
[52] U.S. Cl. .......................................... 322/28; 322/90
[58] Field of Search ........................... 322/89, 90, 28; 374/107, 189; 363/37

[56] References Cited

U.S. PATENT DOCUMENTS

| | | | |
|---|---|---|---|
| 3,753,069 | 8/1973 | Newton | 318/440 |
| 4,310,866 | 1/1982 | Wirth | 361/88 |
| 4,616,485 | 10/1986 | Gillett | 361/22 |
| 4,973,896 | 11/1990 | Shiga | 322/90 |

Primary Examiner—Steven L. Stephan
Assistant Examiner—Adolf Berhane
Attorney, Agent, or Firm—Oblon, Spivak, McClelland, Maier & Neustadt

[57] ABSTRACT

An automobile ac generator system comprises a generator driven by the engine of the automobile, a system controller for converting the ac power generated by the generator to dc power, controlling the generator on the basis of the voltage of the converted dc power and converting the dc power to ac power of commercial line frequency, and a mode switch for selecting among control operating modes of the system controller.

10 Claims, 13 Drawing Sheets

| FIG.5(a) |
|---|
| FIG.5(a)-1 | FIG.5(a)-2 |

RRIOR ART

AUTOMOBILE AC GENERATOR SYSTEM

This application is a continuation-in-part of U.S. Ser. No. 260,918 filed Oct. 21, 1988, now U.S. Pat. No. 4,973,896.

BACKGROUND OF THE INVENTION

1. Field of the Invention

This invention relates to an automobile AC generator system and more particularly to an automobile AC generator system for converting the electric power produced by a generator driven by an automobile engine into ac electric power of desired characteristics, thereby enabling selective supply of electric power to a three-phase load or a single-phase load.

2. Description of the Prior Art

In today's automobiles, the compressor of the air conditioning system is powered by the automobile engine via a belt or the like. That is to say, the power transmission mechanism for the compressor is based on a mechanical linkage between the compressor and the engine.

An alternative system is proposed in Japanese Patent Public Disclosure No. 63(1988)-253897 (U.S. Pat. No. 4,973,856), which describes an automobile generator apparatus for supplying 120 volt ac power at commercial line frequency.

The proposed apparatus is illustrated schematically in FIG. 7. Reference numeral 21 in this figure designates a single-shaft, dual-output generator driven by an engine 1. It is a dual-voltage, high-frequency generator capable of producing a plurality of different voltage outputs. The low-voltage output of the single-shaft, dual-output generator 21 is supplied as low-voltage dc power to a battery 5 through a low-voltage output terminal 41. On the other hand, the high-voltage output of the single-shaft, dual-output generator 21 is supplied as three-phase, high-voltage ac power to a high-voltage output terminal 42, from which it is supplied through a connector box 43 to an inverter 44 for conversion into single-phase 120 volt ac power of commercial line frequency (60 Hz), and then is made available at an outlet 45 for the operation of a home electrical appliance or other such single-phase load.

As shown in FIG. 8, the single-shaft, dual-output generator 21 is, for example, of the three-phase synchronous type having first coils 46a for high-voltage output paired with second coils 46b for low-voltage output, the members of each pair of first and second coils 46a and 46b being serially connected (or wound in parallel) and overlaid in the same slot of the stator. One end of the coils of each phase are connected to a center point C of a star connection. A rotor having a field coil 47 is provided so as to rotate within the stator so that induced voltages can be produced in the first and second coils 46a, 46b by supplying field current through a field current supply terminal 48. The output of the first coil 46a is made available at the high-voltage output terminal 42, while the output of the second coil 46b is converted to dc power by a rectifier 49 and then made available at the low-voltage output terminal 41.

Overall control of the apparatus is conducted by a controller 50 having, inter alia, a voltage control circuit for controlling the voltages produced by the single-shaft, dual-output generator 21, a misoperation prevention circuit and an engine control circuit for controlling an accelerator actuator 36 so as to enable control of the engine 1 even when the automobile is stopped. The accelerator actuator 36 regulates the accelerator system of the engine 1 so as to enable the speed of the engine 1 to be controlled to the desired level. Specifically, the speed of the engine 1 is controlled on the basis of a drive signal output by the controller 50.

The controller 50 receives a load current detection signal from the connector box 43 and an engine speed detection signal from an ignition coil 51 for supplying ignition voltage to the spark plugs of the engine 1 and, on the basis of these signals, drives the accelerator actuator 36 so as to regulate the speed of the engine 1 to a level enabling output of electric power in an amount appropriate in light of the amount of power consumed by the load plugged into the outlet 45.

For ensuring safe regulation of the accelerator actuator 36 by the controller 50, the misoperation prevention circuit of the controller 50 receives a hand brake status signal and connector status signals, and on the basis of these produces a first misoperation prevention signal disabling the accelerator actuator 36, a second misoperation prevention signal for producing an audible alarm and the like.

The connector box 43 may be omitted where a system controller 52 is constituted by a unit comprising the inverter 44 and the controller 50 and has a construction such that the high voltage output from the generator is controllable when being input to the system controller 52.

However, since the generator apparatus separately provided in the automobile is used solely for supplying electric power to external loads and the air conditioning system is arranged in the conventional manner, the power supplied to the compressor of the air conditioner is dependent on the engine speed.

More specifically, since the engine speed is low immediately after starting, compressor operation is inadequate for achieving the target temperature to which the automobile interior is to be controlled. Further, as the temperature of the engine cooling water is low immediately after the engine is started, it will not be possible to heat the interior of the automobile by turning on the heater.

On the other hand, while the automobile is being driven, the compression cycle of the compressor becomes shorter and the output of the air conditioning apparatus is forced to a high level even though this may not be desired. As a result, the car interior tends to be overheated or overcooled, pointing up the difficulty of maintaining a pleasant car interior temperature with an air conditioning apparatus that is directly driven by the engine.

Moreover, the compressor is mounted on the engine and consequently vibrates together with it. It thus becomes necessary to use flexible rubber hoses for feeding refrigerant to the compressor from a heat exchanger fixed on the automobile body and for feeding refrigerant from the compressor to a condenser fixed on the automobile body. Because of this, there is a risk of refrigerant escaping into the atmosphere as a result of hose breakage or deterioration.

In air conditioning apparatuses which use Freon gas as the refrigerant, oil seals are used for sealing the rotating shaft of the compressor. The Freon gas tends to leak gradually from the vicinity of the oil seals and small amounts of Freon gas also find their way to this region form the rubber hoses, so that a large amount of the gas is allowed to escape into the atmosphere over extended periods of use. This is particularly undesirable in view of the deleterious effect of Freon gas on the earth's ozone layer. Then when the automobile is junked, the hoses connecting the compressor with the condenser and the heat exchanger are generally severed as part of the disassembly process, resulting in the release of additional large amounts of Freon gas into the atmosphere.

OBJECT AND SUMMARY OF THE INVENTION

One object of the invention is to provide an automobile ac generator system enabling an air conditioning apparatus of a sealed type preventing Freon gas from escaping into the atmosphere to conduct air conditioning of the interior of an automobile in accordance with the interior temperature independently of the engine speed and also capable of selectively supplying single-phase 120-volt ac power of commercial line frequency and three-phase 240-volt ac power of commercial line frequency to external loads.

For achieving this object, the present invention provides an improved automobile ac generator system comprising:

a generator driven by the engine of the automobile, a system controller for voltage control and frequency conversion of the ac power generated by the generator, control operation selection means (a mode switch) for selecting among control operating modes of the system controller, and a battery for supplying electric power to the system controller, wherein the improvement comprises:

rectification means for converting the ac power produced by the generator into dc power, generator control means for detecting the voltage of the dc power rectified by the rectification means and controlling the generator on the basis of the detected voltage, an inverter for converting the dc power from the rectification means into single-phase ac power of commercial line frequency and three-phase ac power of commercial line frequency, and conversion mode control means for controlling the conversion operation of the inverter in response to the control mode selected by the control operation selection means.

The invention further provides an improved automobile ac generator system comprising:

a single-shaft, dual-output ac generator having a stator provided with coils for low-voltage output and coils for high-voltage output and a rotor disposed inside the stator and driven to rotate by the automobile engine, the generator providing a low-voltage output at low-voltage output terminals of the coils for low-voltage output and a high-voltage output at high-voltage output terminals of the coils for high-voltage output, first rectification means for converting ac power supplied from the low-voltage terminals of the single-shaft, dual-output ac generator into dc power, a system controller for voltage control and frequency conversion of the ac power generated by the single-shaft, dual-output ac generator, a control operation selection means for selecting among control operating modes of the system controller, and a battery for storing the electric power generated by the generator and supplying electric power to the system controller, wherein the system controller comprises:

second rectification means for converting ac power from the high-voltage terminals of the single-shaft, dual-output ac generator into dc power, generator control means for detecting the voltages of the dc power rectified by the first rectification means and controlling the generator on the basis of the detected voltages, an inverter for converting the dc power from the second rectification means into single phase ac power of commercial line frequency and three-phase ac power of commercial line frequency, and conversion mode control means for controlling the conversion operation of the inverter in response to the control mode selected by the control operation selection means.

In addition, the invention provides such an automobile ac generator system further comprising a temperature sensing means for detecting the temperature of the automobile interior and an air conditioning apparatus operated by the three-phase ac power of variable frequency output by the inverter of the system controller, wherein the voltage and frequency of the three-phase ac power output by the inverter are variably controlled by the conversion mode control means in response to the temperature detected by the temperature sensing means.

The invention also provides such an automobile ac generator system adapted to be used when the automobile stops and further comprising an accelerator actuator for regulating the accelerator system of the engine so as to regulate the engine speed and an engine control means provided in the system controller for controlling the accelerator actuator in response to the amount of electric power consumed by the load to which electric power is being supplied.

In accordance with the control mode of the system controller selected via the control operation selection means, the ac power produced by the generator is converted to and supplied from the system controller as single-phase ac power of commercial line frequency or three-phase ac power of commercial line frequency.

Use of a single-shaft, dual-output ac generator makes it possible to obtain a high-voltage output and a low-voltage output from a single generator.

Since the conversion mode control means of the system controller variably controls the voltage and frequency of the output power in response to the temperature detected by the temperature sensing means provided inside the automobile, the output of the air conditioning apparatus can be variably controlled in accordance with the temperature inside the car.

As the accelerator actuator is controlled by the engine control means provided in the system controller, the engine speed is controlled such that the amount of electric power produced by the generator driven by the engine can be regulated so as to match the amount of electric power being consumed by the load.

The above and other objects and features of the invention will become apparent from the following detailed description with reference to the accompanying drawings.

DESCRIPTION OF THE PREFERRED EMBODIMENTS

Figure 1:
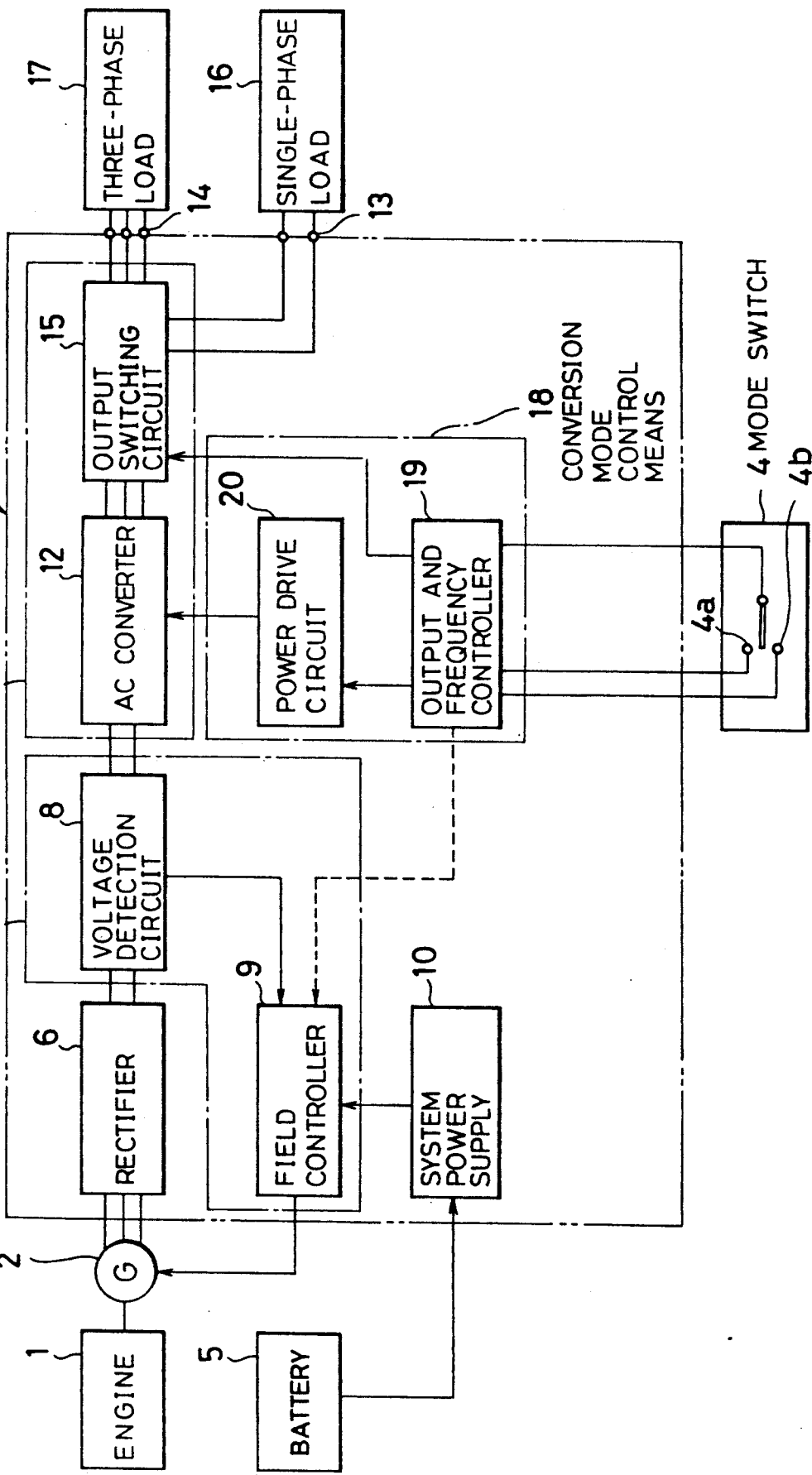
FIG. 1 is a block diagram of an automobile ac generator system according to a first embodiment of the present invention.

A first embodiment of the automobile ac generator system according to the present invention is illustrated in FIG. 1. The system comprises a generator 2 driven by an automobile engine 1, a system controller 3 for voltage control and frequency conversion of the ac power produced by the generator 2, a mode switch 4 serving as an operating mode selection means for selecting the operating mode of the system controller 3, and a battery 5 for supplying electric power to the system controller 3. The system controller 3 can be installed in the automobile engine compartment, for example, while the mode switch 4 is preferably mounted in the vicinity of the driver's seat. The generator 2 is driven by the engine 1 via a mechanical linkage such as a belt. Within the operating speed range of the engine 1 it is capable of producing a high-frequency output of, for example, a single-phase 120-volt (a household power source) and three-phase of 240-volt (a power source for driving motors etc.). The battery 5 is charged by an ac generator provided separately from the generator 2.

The system controller 3 will now be explained.

The ac power produced by the generator 2 is converted to dc electric power by a rectifier 6 (rectification means). A generator control means 7 controls the voltage produced by the generator 2 so as to maintain the voltage of the dc power obtained from the rectifier 6 at a constant level. The generator control means 7 is constituted of, for example, a voltage detection circuit 8 for detecting the voltage of the dc power supplied by the rectifier 6 and a field controller 9 which regulates the field voltage supplied to the generator 2 on the basis of the voltage detected by the voltage detection circuit 8. The field current supplied to the generator 2 by the field controller 9 is obtained from the battery 5. Thus, for example, the system controller 3 is provided with a system power supply 10 for supplying operating power to the various sections within the system controller 3 and the power for field control is supplied to the field controller 9 by the system power supply 10 which obtains its power from the battery 5.

The dc power regulated to a fixed voltage in the aforesaid manner is supplied to an inverter 11 in which it is converted to single-phase ac power of commercial line voltage and frequency (120 V, 60 Hz) or three-phase ac power of commercial line voltage and frequency (240 V, 60 Hz). The inverter 11 is constituted, for example, of an ac converter 12 (consisting of a power switching element such as a power transistor, for example) capable of converting dc power to ac power of desired frequencies and an output switching circuit 15 which can be operated to selectively supply the ac power from the ac converter 12 to a first outlet 13 for a single-phase load 16 (a home electrical appliance, for example) or a second outlet 14 for a three-phase load 17 (a motor, for example). Suitable single-phase and three-phase loads 16 and 17 are connected respectively to the first and second outlets 13 and 14.

The conversion mode of the inverter 11 is controlled by a conversion mode control means 18 in accordance with the mode selected using the mode switch 4. The conversion mode control means 18 is arranged, for example, so as to control the switching operation of the output switching circuit 15 in accordance with the mode selected using the mode switch 4 and is constituted of an output and frequency controller 19 for setting the voltage and frequency of the power output by the ac converter 12 and a power drive circuit 20 for controlling the ac converter 12 so as to obtain a power output of the frequency set by the output and frequency controller 19.

The mode switch 4 has two selectable terminals 4a and 4b. When the terminal 4a is selected, the output and frequency controller 19 outputs a predefined control signal to the power drive circuit 20 and controls the output switching circuit 15 so as to cause electric power to be output from the first outlet 13. As a result, ac power of a prescribed frequency (e.g. 60 Hz) and voltage (e.g. 120 V) is supplied to the single-phase load 16 through the first outlet 13, making it possible to operate a home electrical appliance or the like inside the automobile.

The single-phase load 16 might be a heater for quick removal of frost from the automobile windshield during winter operation, a heater for rapidly warming the interior of the automobile from immediately after the engine is started, or an ordinary home appliance. The effect realized by operating a space heater is particularly notable since it makes it possible to warm up the passenger compartment from immediately after engine start, before the automobile air conditioning system is able to deliver warm air.

When the terminal 4b of the mode switch 4 is selected, the output and frequency controller 19 sends a predefined control signal to the power drive circuit 20 and controls the output switching circuit 15 so as to cause electric power to be output from the second outlet 14. As a result, three-phase 240-volt ac power of a prescribed frequency (e.g. 60 Hz) is supplied to the three-phase load 17 through the second outlet 14. The three-phase load 17 is, for example, an automobile air conditioning system powered by a three-phase synchronous motor, and can be maintained in a good operating state, substantially unaffected by the speed of the engine 1, by the stable ac power supplied thereto from the system controller 3.

Thus the automobile ac generator system having the system controller 3 of the aforesaid arrangement is, in accordance with which of the terminals 4a and 4b is selected, able to supply the ac power produced by the generator 2 as single-phase ac power of commercial line voltage and frequency or three-phase ac power of commercial line voltage and frequency, making it possible to selectively supply single-phase and three-phase power using only a single generator. The automobile ac generator system according to this invention thus has high practical value.

If neither of the terminals 4a and 4b of the mode switch 4 is selected, the system controller 3 puts the system into an inoperative state in which no electric power is generated.

Moreover, it is alternatively possible to separately provide a generated power voltage setting means for variably setting the voltage of the electric power output by the system controller 3. In this case, the output and frequency controller 19 and the output of the conversion mode control means 18 are controlled by the voltage detection circuit 8 of the generator control means 7 on the basis of the generated power voltage information input to the generated power voltage setting means by the operator. As a result it becomes possible to obtain a desired voltage from the generator 2. The automobile ac generator system of this arrangement has particularly wide utility since it enables supply of a voltage controlled in accordance with the rated voltage of a broad range of loads.

Figure 2:
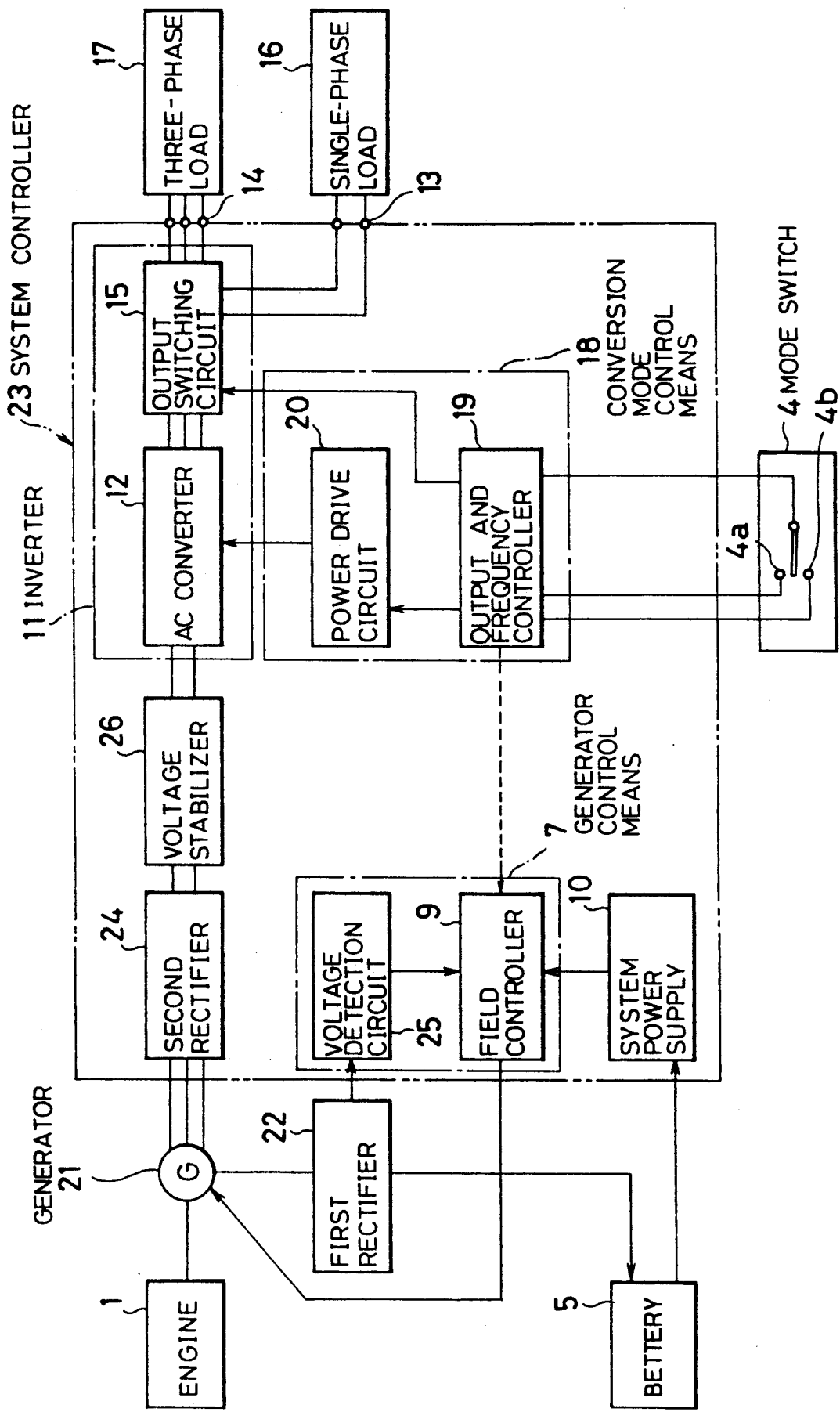
FIG. 2 is a block diagram of an automobile ac generator system according to a second embodiment of the present invention.

FIG. 2 shows a second embodiment of the automobile ac generator system according to this invention, in which there is used a single-shaft, dual-output generator 21 capable of producing both a high-voltage output and a low-voltage output when powered by the engine 1. The low-voltage output from the low-voltage output terminal of the single-shaft, dual-output generator 21 is rectified by a first rectifier 22 and supplied to a battery 5.

The high-voltage output produced by the single-shaft, dual-output generator 21 is voltage-controlled and frequency-converted in a system controller 23 which comprises a second rectifier 24 (rectification means). The high-voltage output from the high-voltage output terminal of the single-shaft, dual-output generator 21 is rectified by the second rectifier 24.

The rectified low-voltage dc power from the first rectifier 22 is supplied to a voltage detection circuit 25. The voltage detected by the voltage detection circuit 25 is sent to a field controller 9 which uses it as the basis for controlling the field current of the generator 21. That is to say, the voltage detection circuit 25 and the field controller 9 together constitute a generator control means 7. The rectified dc power from the first rectifier 22 is supplied to the battery 5 which in turn supplies power to a system power supply 10 of the system controller 23.

The aforesaid arrangement enables the single-shaft, dual-output generator 21 to serve also as a generator for charging the battery 5, making it unnecessary to provide a separate generator for battery charging and thus reducing the amount of space required for installation of the generator system.

On the other hand, since the dc from the second rectifier 24 varies owing to the intensity of the low-voltage side output current, it is voltage-controlled by a voltage stabilizer 26 and thereafter, in the same manner as was described with respect to the first embodiment, the dc power is forwarded to an inverter 11 constituted of an ac converter 12 and an output switching circuit 15, where it is converted into ac power which is in turn supplied to a first outlet 13 or a second outlet 14 under the control of a conversion mode control means 18 constituted of an output and frequency controller 19 and a power drive circuit 20.

The low-voltage side output voltage of the single-shaft, dual-output ac generator 21, which is changed by switching the mode of the high-pressure side output voltage, may be converted into a suitable level by any suitable conventional technique and then supplied to the battery 5.

Figure 3A:
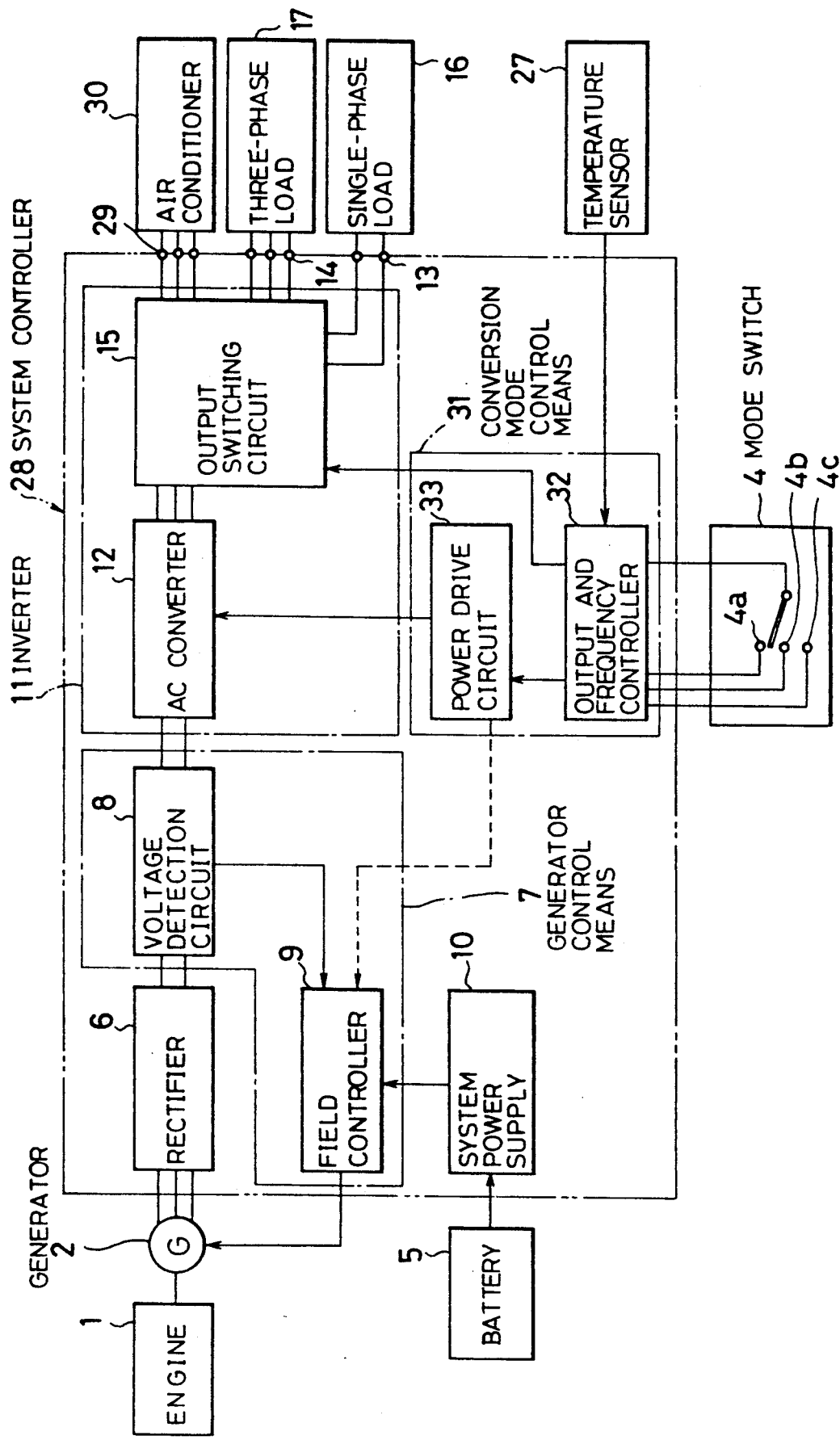
FIG. 3(a) is a block diagram of an automobile ac generator system according to a third embodiment of the present invention.

A third embodiment of the invention is shown in FIG. 3(a). This embodiment of the automobile ac generator system has a temperature sensor 27 (temperature detection means) disposed at an appropriate position inside the automobile for detecting the inside temperature and power is supplied from a third outlet 29 (for outputting three-phase ac power of variable voltage and variable frequency) of a system controller 28 to a sealed type automobile air conditioner 30.

The temperature detected by the temperature sensor 27 is supplied as interior temperature information to a conversion mode control means 31 of the system controller 28. In the case where terminal 4c of a mode switch 4 has been selected, an output and frequency controller 32 of the conversion mode control means 31 carries out a prescribed computation based on the interior temperature information so as to set the voltage and frequency of the output from the third outlet 29, whereafter a power drive circuit 33 controls an ac converter 12 so as to produce an output of the set voltage and frequency.

In other words, the system controller 28 appropriately varies the voltage and frequency of the three-phase ac power supplied to the automobile air conditioner 30 through the third outlet 29 so as to vary the operating cycle of the compressor of the automobile air conditioner 30 and thus automatically control the air conditioning power of the automobile air conditioner 30. In the case where there is a large difference between the interior temperature and the set temperature, for example, the automobile air conditions conditioner 30 is supplied with high-voltage high-frequency electric power for increasing the air conditioning capacity of the air conditioner and reducing the time required for bringing the interior temperature into the vicinity of the set temperature. On the other hand, when the difference between the two temperatures is small, the automobile air conditioner 30 is supplied with low-voltage low-frequency electric power for lowering the air conditioning capacity of the air conditioner. It is thus possible to prevent the automobile air conditioner from overheating or overcooling the car interior.

While in this embodiment the output and frequency controller 32 of the conversion mode control means 31 sets the voltage and frequency of the output power on the basis of the temperature detected by the temperature sensor 27, the invention is not limited to this method and it is alternatively possible to enable the system controller 28 to automatically control the interior temperature using appropriate conventional techniques.

There will now be explained a specific example in which the inverter 11 is constituted as a pulse width modulation (PWM) type variable voltage, variable frequency (VVVF) inverter.

In the PWM system, the output is controlled so as to maintain the relationship between the voltage V and the frequency F as V/F=Constant. Thus the voltage is lowered at low frequencies and increased at high frequencies so as to drive the compressor of the automobile air conditioner at a constant torque.

Figure 4A:
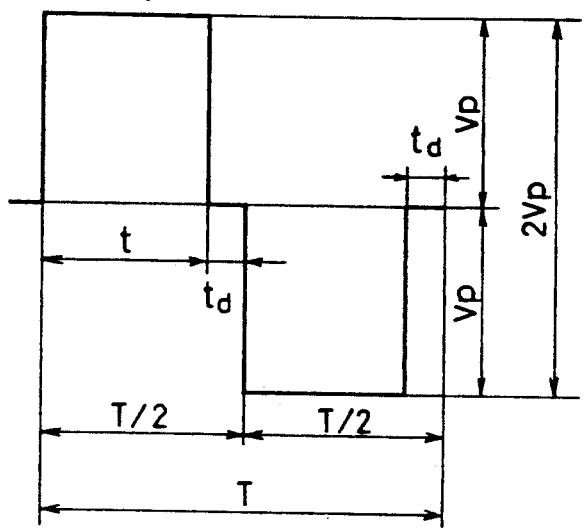
FIGS. 4(a) to 4(c) are wave-forms of pulses converted by an inverter.
Figure 4B:
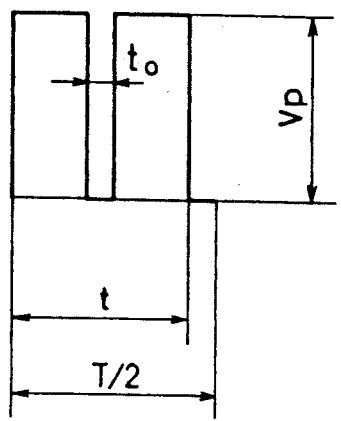

At the time the inverter converts a given input voltage (e.g. 240 V) into pulses of a period T such as shown in FIG. 4(a), it is possible to obtain an output of desired frequency by appropriately varying the period T.

Further, the duty ratio ($\tau$/T) of the so obtained pulses can be varied so as to vary the effective voltage value at the time the pulses are converted into a sine wave, whereby it becomes possible to obtain the desired voltage.

Figure 4C:
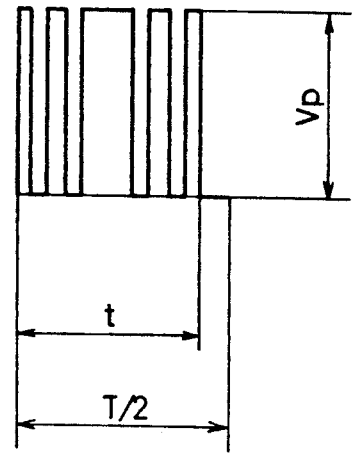

For example, the duty ratio t/T of the pulses (of pulse width T) shown in FIG. 4(a) can be changed to $(t-t_0)/T$ by providing an off time $t_0$ within the pulse width t and it thus becomes possible to reduce the effective value of the voltage. In other words, off times are inserted within the pulse width t so as to divide the half period into a plurality of pulses (FIG. 4(c)) and thus carry out control for obtaining the desired ac voltage. It should also be noted that this conversion into a pulse train consisting of many pulses also contributes to improvement of the output waveform.

Thus an appropriate frequency is determined on the basis of the temperature information from the temperature sensor 27 and $\tau^1$ is varied so as to obtain a voltage value at which the relationship V/F=Constant is maintained, thus ensuring ideal operation of the automobile air conditioner 30.

Figure 3B:
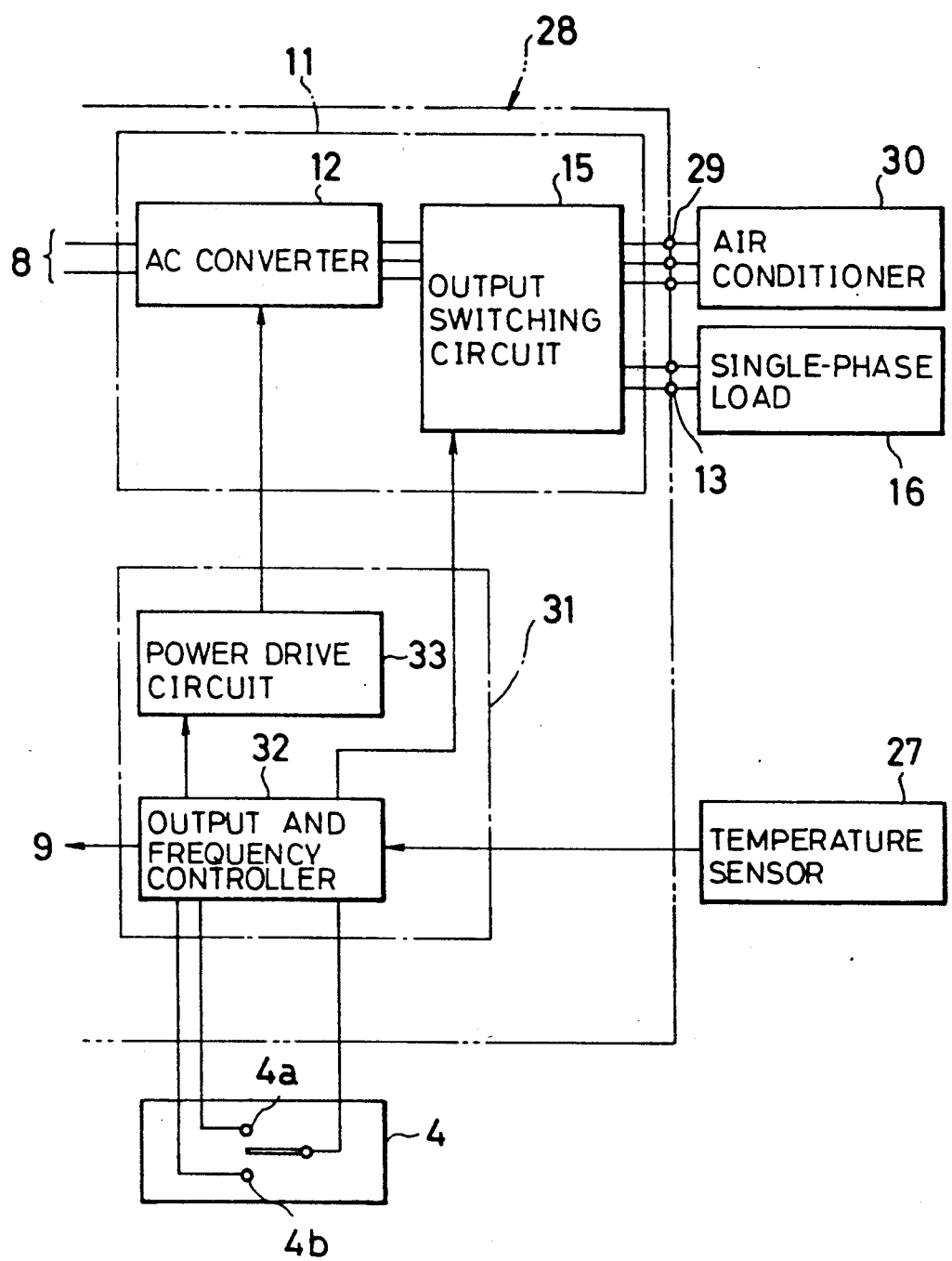
FIG. 3(b) is a block diagram illustrating the automobile ac generator system of FIG. 3(a) loaded with an air conditioner and a single-phase load of 120 V.
Figure 3C:
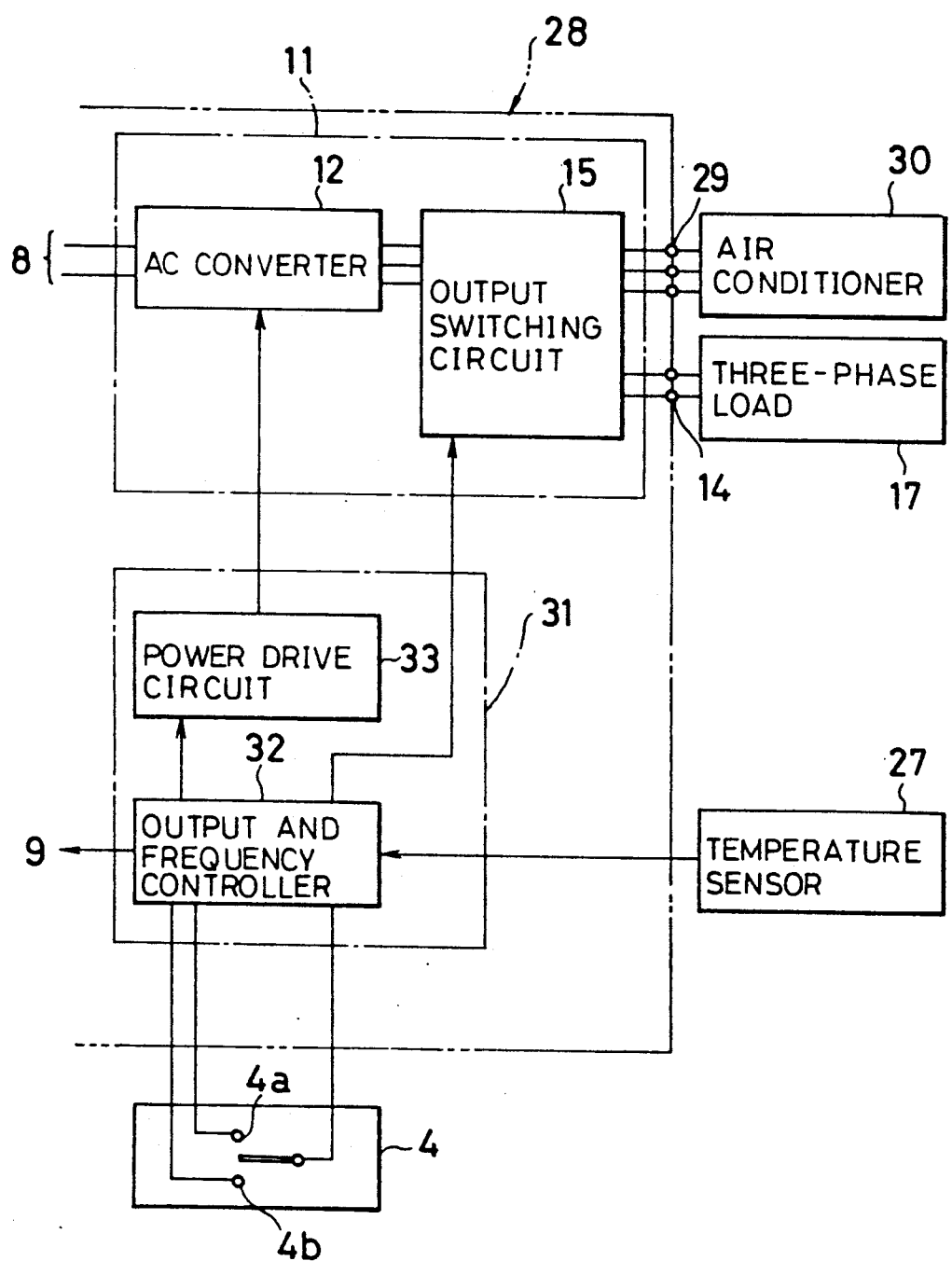
FIG. 3(c) is a block diagram illustrating the automobile ac generator system of FIG. 3(a) loaded with an air conditioner and a three-phase load of 240 V.

In FIG. 3(b) the control operation selection means is constituted of a mode switch 4 having two selectable terminals 4a and 4b. When the terminal 4a is selected, for example, single-phase ac power of commercial line frequency may be output from the first outlet 13 to the single-phase load 16 and, where the terminal 4b is selected, three-phase ac power of variable voltage and variable frequency may be output from the third outlet 29 to the air conditioner 30. Alternatively, as shown in FIG. 3(c), three-phase ac power of commercial line frequency may be output to the three-phase load 17 or three-phase ac power of variable voltage and variable frequency may be output to the air conditioner 30.

Figures 1, 5A:
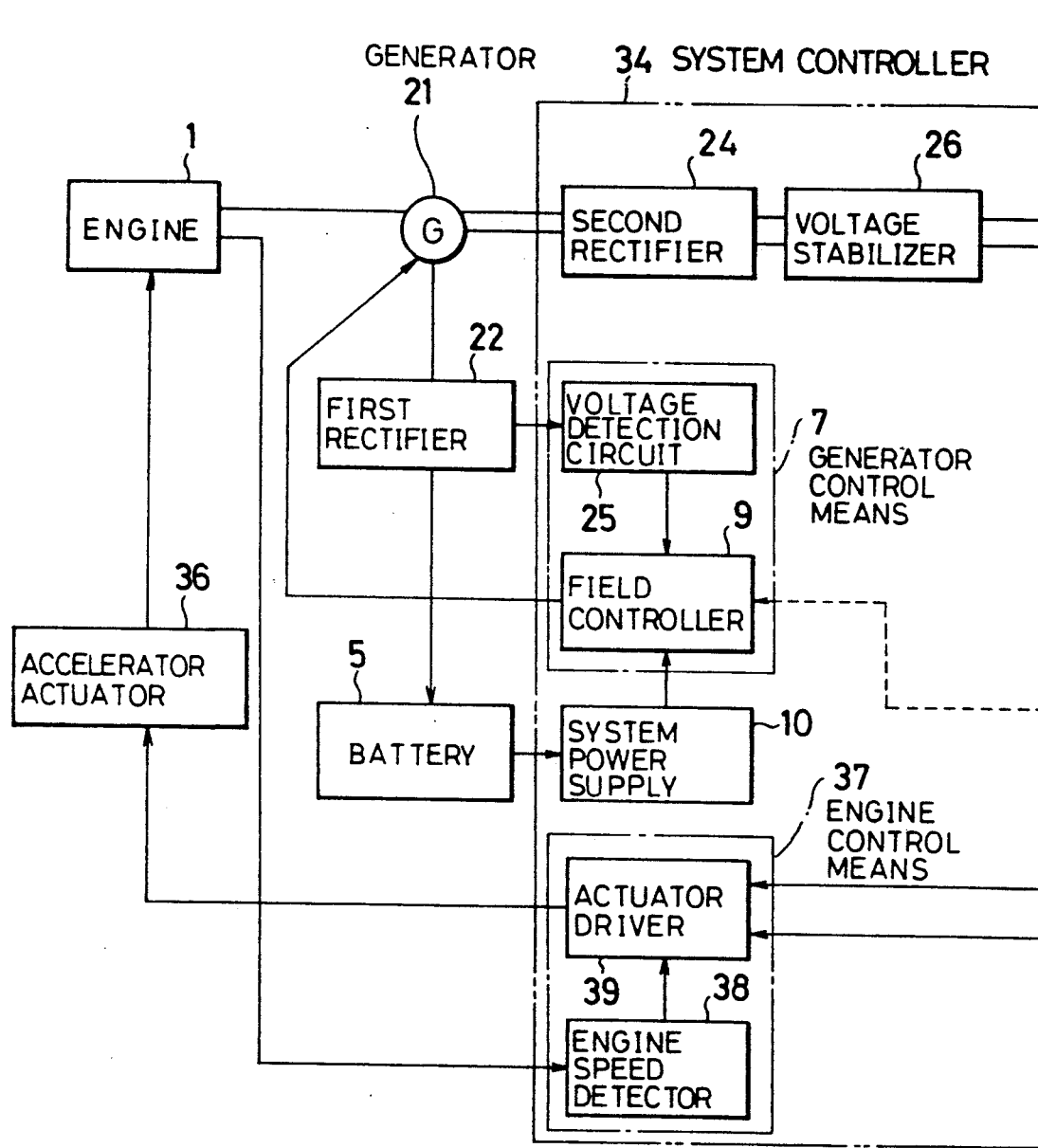
FIG. 5(a) is a block diagram of an automobile ac generator system according to a fourth embodiment of the present invention.
Figures 2, 5A:
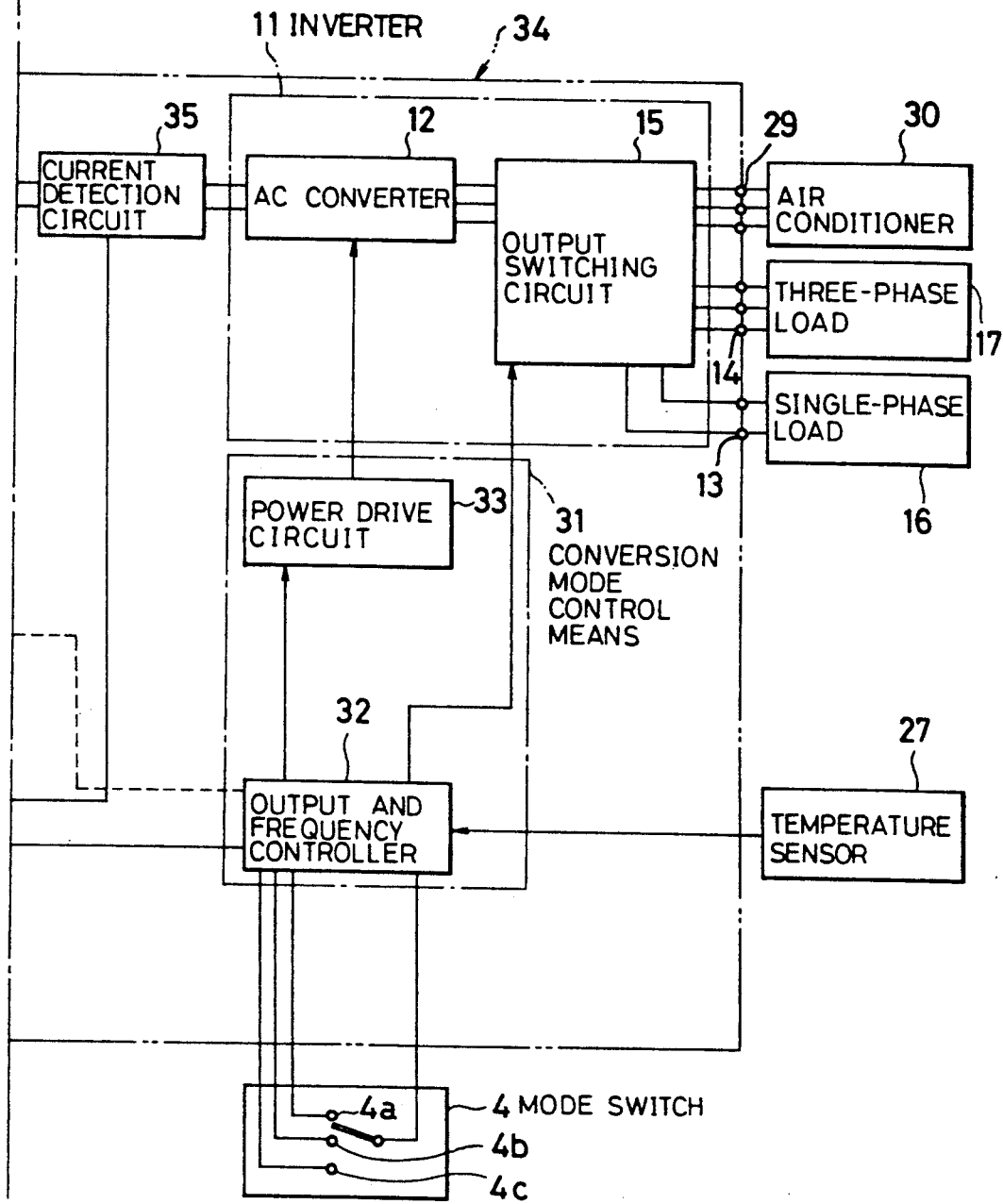

FIG. 5(a) shows a fourth embodiment of the invention in which the ac power produced by a single-shaft, dual-output generator 21 is converted and output by a system controller 34. The high-voltage output supplied to the system controller 34 by the single-shaft, dual-output generator 21 is converted to dc power by a second rectifier 24 and then supplied to a current detection circuit 35 through a voltage stabilizer 26. The current detection circuit 35 detects the load current, which varies depending on the electrical load connected with first, second and third outlets 13, 14 and 29 of an inverter 11.

The low-voltage ac power supplied to the system controller 34 by the single-shaft, dual-output generator 21 is sent to a first rectifier 22 where it is converted into dc power and then supplied to a battery 5 and a voltage detection circuit 25. The voltage detected by the voltage detection circuit 25 is supplied to a field controller 9 which on the basis of the detected voltage controls the field current supplied to the single-shaft, dual-output generator 21 so as to maintain the voltage at a constant level. That is to say, the voltage detection circuit 25 and the field controller 9 together constitute a generator control means 7.

The automobile ac generator system in accordance with this embodiment is further provided with an accelerator actuator 36 capable of regulating the engine accelerator system for controlling the engine speed as desired. A system controller 34 of the system has an engine control means 37 for controlling the accelerator actuator 36.

The provision of the accelerator actuator 36 for regulating the engine speed makes it possible for the automobile ac generator system to selectively supply single-phase ac power of commercial line frequency, three-phase ac power of commercial line frequency or three-phase power of variable voltage and variable frequency to the first, second and third outlets 13, 14 and 29 even when the automobile is stopped and to automatically regulate the engine speed so as to obtain an output corresponding to the load current. The generate-when-stopped mode in which the speed of the engine 1 is controlled by the accelerator actuator 36 is implemented automatically when, for example, the system controller 34 detects that the accelerator actuator 36 has been set in position above the accelerator pedal. Alternatively, the system can be arranged so that the generate-when-stopped mode is implemented by setting the mode switch 4.

When the system has been set to the generate-when-stopped mode, the engine control means 37 begins to control the accelerator actuator 36. The engine control means 37 can be constituted of, for example, an engine speed detector 38 connected with the ignition coil of the engine 1 and an actuator driver 39 which appropriately drives the accelerator actuator 36 on the basis of engine speed data received from the engine speed detector 38 and the load current value received from the current detection circuit 35. It thus regulates the engine speed so that there can be obtained an amount of electric power matched to the electrical loads connected with each outlet.

More specifically, the actuator driver 39 compares the engine speed with the load current and if the electrical load is higher than the amount of electric power produced at the current engine speed, it sends a drive signal to the accelerator actuator 36 instructing it to depress the accelerator pedal. On the other hand, if the electrical load is lower than the amount of electric power produced at the current engine speed, the actuator driver 39 sends a drive signal to the accelerator actuator 36 instructing it to release the accelerator pedal. The engine 1 is thus controlled so as to generate an amount of electric power matched to the amount of power being consumed by the load. The speed of the engine 1 is thus raised and/or lowered until the amount of electric power being produced and the amount of electric power being consumed by the load are equal, whereafter the actuator driver 39 issues no further drive signals and the accelerator actuator 36 is not further driven, so that the accelerator pedal is maintained in such position and the engine speed is held at that appropriate for the load.

Thus even where the system is used for operating a piece of outdoor-use electrical equipment requiring a large amount of power, such as a chain saw, the amount of electric power produced will be automatically regulated in response to the electrical load. The risk of not being able to operate the piece of equipment because of insufficient power is thus greatly reduced. In the case of a small electrical load, on the other hand, the energy utilization efficiency is enhanced by suppressing the engine speed.

Since three-phase output voltage differs from single-phase output voltage, the actuator driver 39 cannot determine from only the value detected by the current detection circuit 35 whether the output from the generator is suitable in light of the power consumed by the loads. For this reason, the actuator driver 39 controls the accelerator actuator 36 to be driven in line with the output mode controlled by the output and frequency controller 32, thereby making it possible to obtain a suitable output of the generator.

Figure 5B:
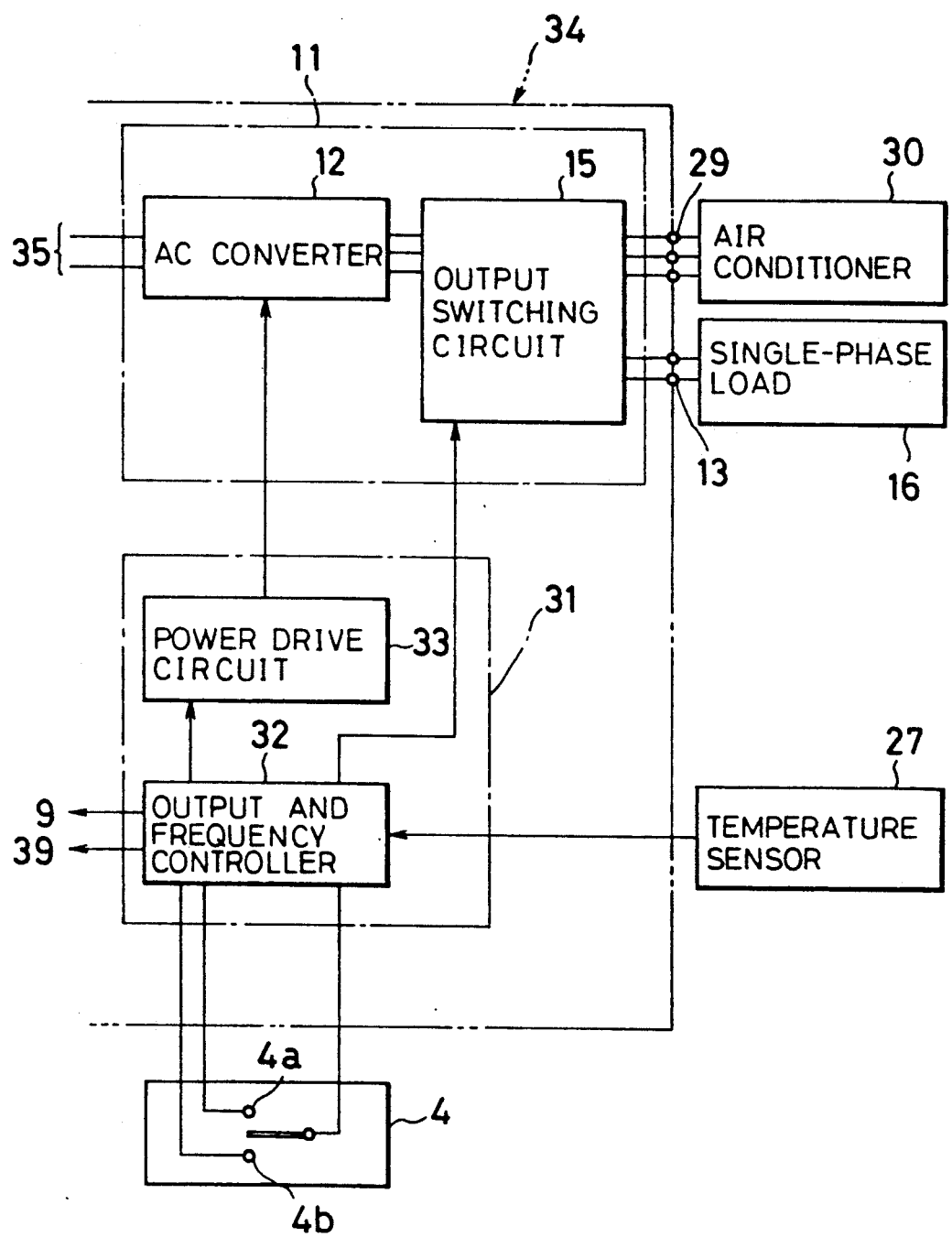
FIG. 5(b) is a block diagram illustrating the automobile ac generator system of FIG. 5(a) loaded with an air conditioner and a single-phase load of 120 V.
Figure 5C:
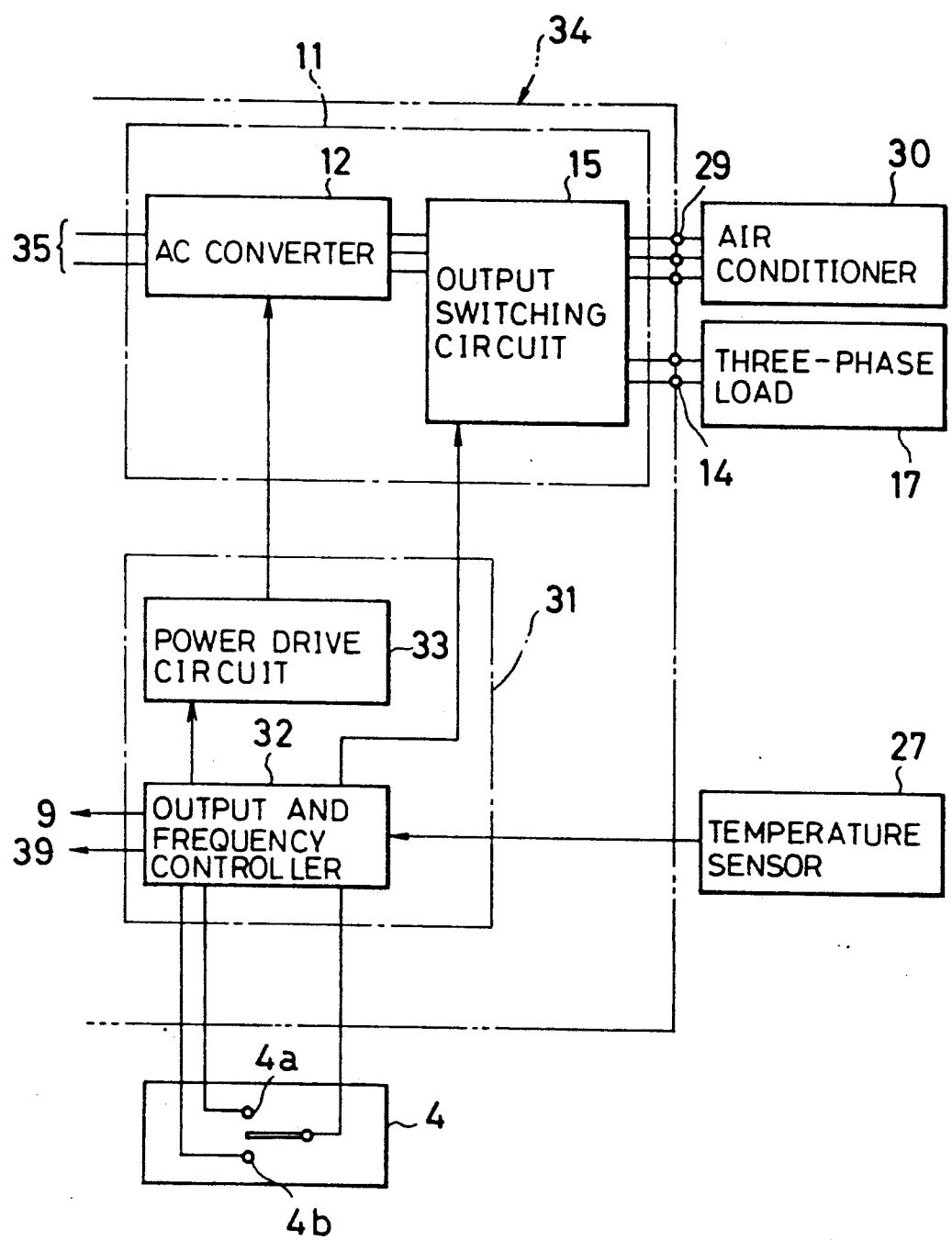
FIG. 5(c) is a block diagram illustrating the automobile ac generator system of FIG. 5(a) loaded with an air conditioner and a three-phase load of 240 V.

The embodiment shown in FIG. 5(a) employs a single-shaft, dual-output generator which is capable of simultaneously outputting a high voltage and a low voltage that is supplied to the battery. However, it is instead possible to use a single-voltage, high-frequency generator capable of producing only a high voltage and, as illustrated in FIGS. 5(b) and 5(c), the high voltage may be output selectively to the single-phase load 16 and air conditioner 30 or to the three-phase load 17 and air conditioner 30.

Figure 6:
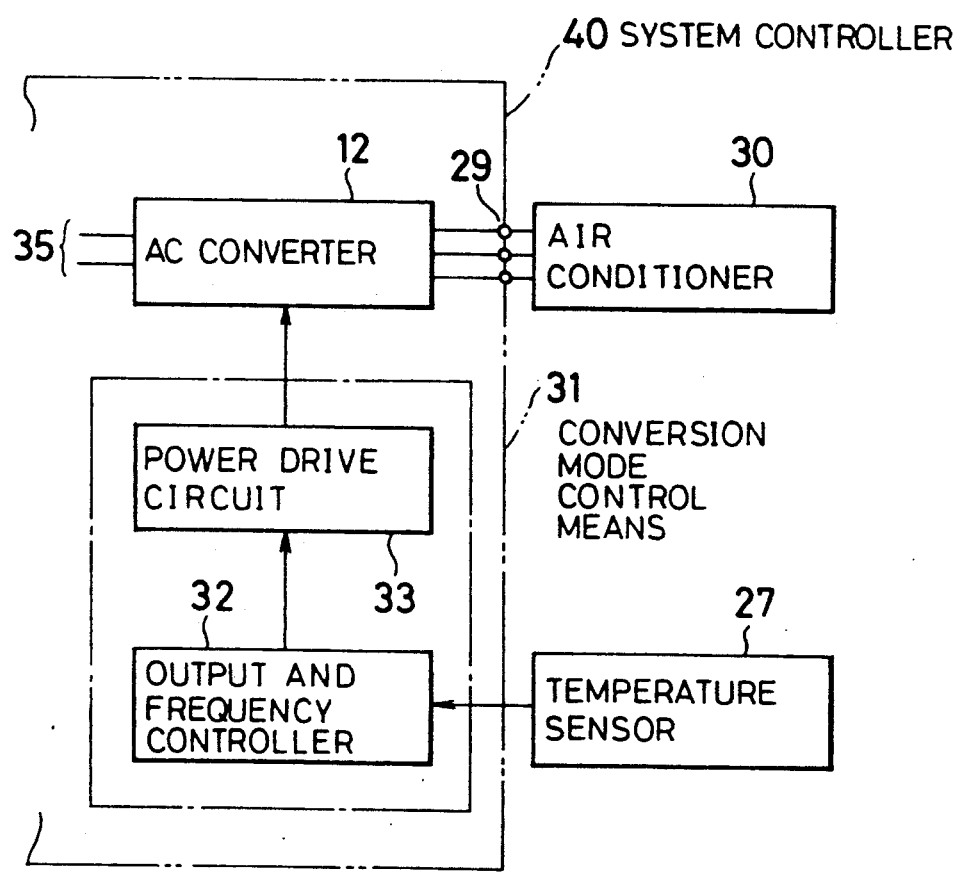
FIG. 6 is a block diagram of an automobile ac generator system according to a fifth embodiment of the present invention.
Figure 7:
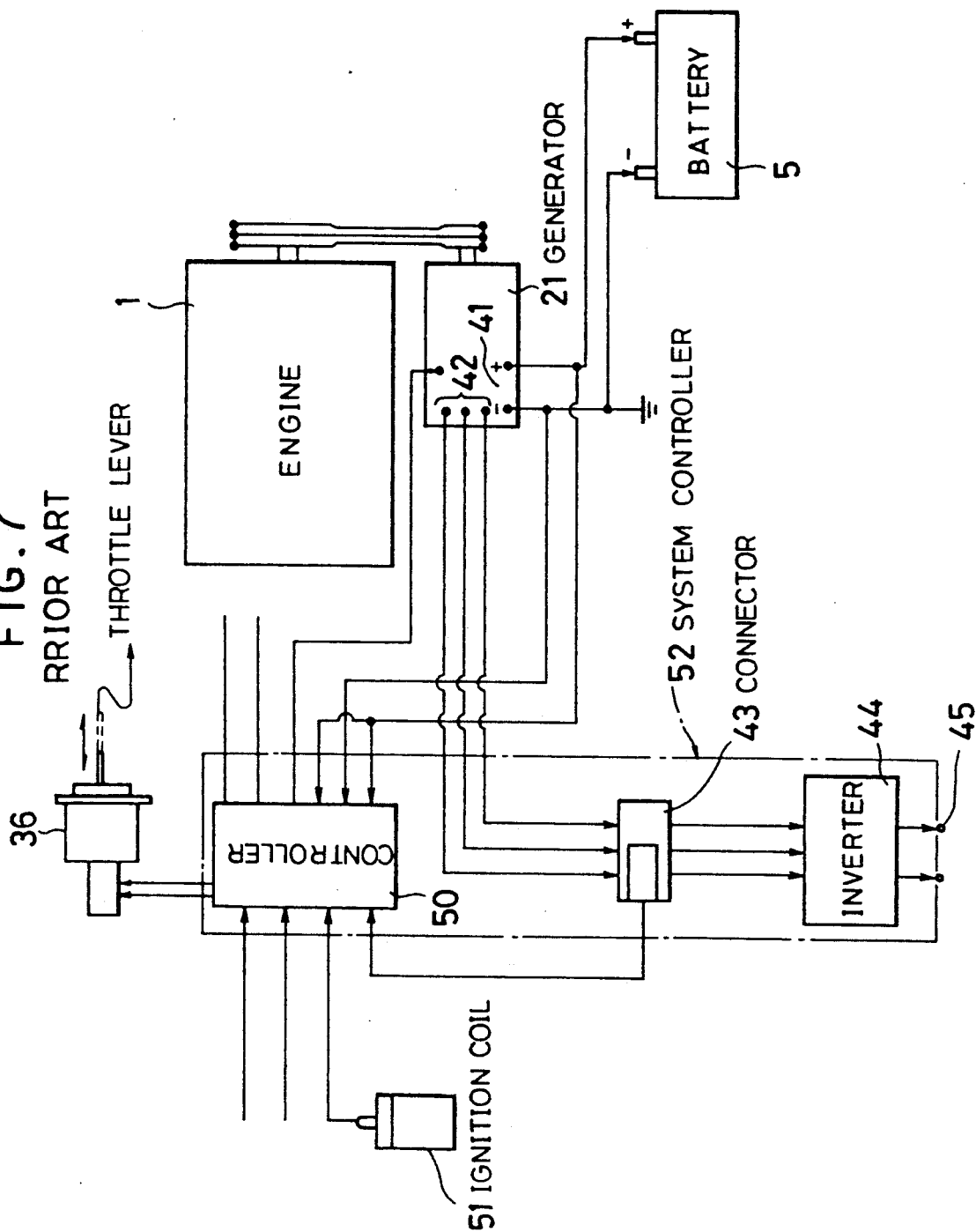
FIG. 7 is a diagram showing the arrangement of a conventional automobile generator apparatus.
Figure 8:
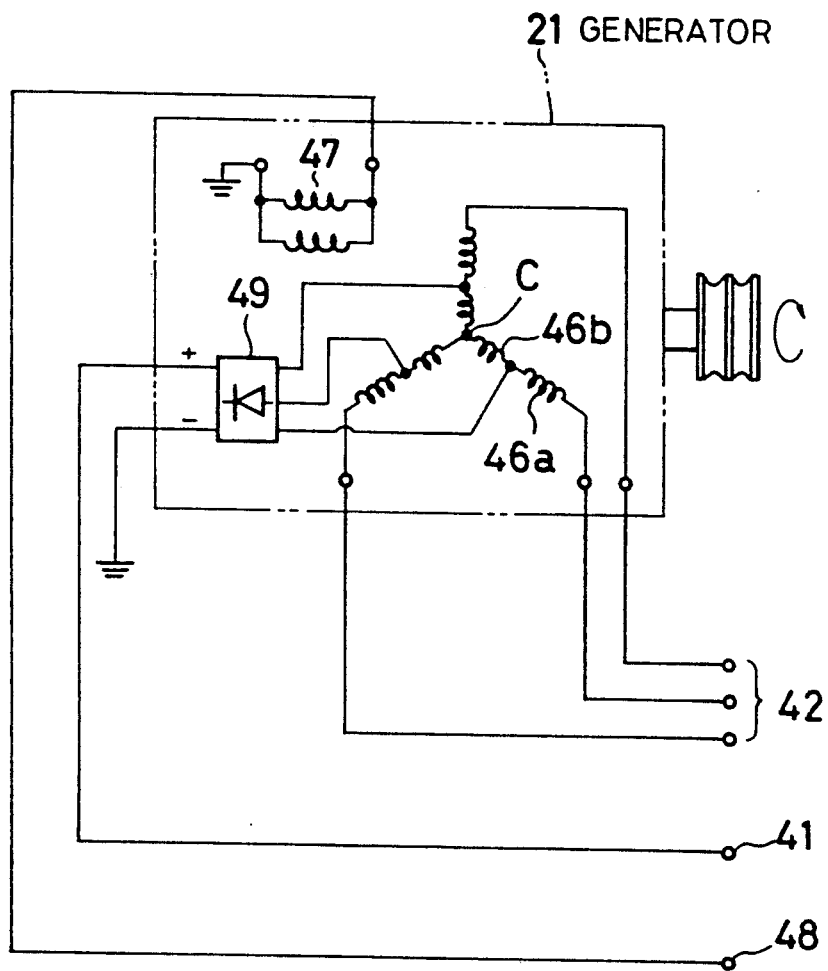
FIG. 8 is a schematic diagram of a conventional single-shaft, dual-output generator.

On the other hand, where it suffices to supply variable voltage, variable frequency three-phase power to only the automobile air conditioner 30, it is possible, as shown in FIG. 6, to eliminate the mode switch 4 and to employ a system controller 40 whose inverter is constituted solely of the ac converter 12. In the so-constituted automobile ac generator system for use exclusively with an automobile air conditioner, the generator system for supplying power to the inverter can, for example, be appropriately constituted in accordance with any of the above-described embodiments.

The present invention has thus been shown and described with reference to specific embodiments. However, it should be noted that the present invention is in no way limited to the details of the described arrangements but changes and modifications may be made without departing from the scope of the appended claims.

In the present invention, the generator is controlled by the system controller and the voltage and frequency of the ac power produced by the generator are appropriately varied prior to output, thereby enabling selective supply of ac power of an appropriate voltage and frequency to be output to a three-phase load or a single-phase load.

Specifically, the output of the system controller can be switched over so as to enable selective supply of single-phase, 120-volt ac power of commercial line frequency to a single-phase load such as a home electrical appliance and of three-phase, 240-volt ac power of commercial line frequency to a three-phase load such as a motor. As it therefore becomes possible to operate electrical equipment outdoors without need of a separate generator, the system according to the invention has high practical utility.

Moreover, since the system controller appropriately varies the voltage and frequency of the ac power supplied to the automobile air conditioner (a three-phase load) in response to the temperature detected by the temperature detection means, the operating cycle of the compressor of the air conditioner is varied such that the air conditioning capacity of the air conditioner can be controlled without being substantially affected by the engine speed. Where the air conditioner is equipped with an ac compressor, therefore, it becomes possible to operate the air conditioner for rapidly cooling or warming the interior of the automobile even from immediately after the engine is started. Moreover, it is also possible to prevent overheating and overcooling by the air conditioner when the engine is being operated at a high speed. The invention also enables the ac compressor, condenser, radiator and the like of the air conditioner to be consolidated in a single unit and the refrigerant to be circulated through hermetically sealed metal pipes, whereby leakage of the refrigerant during use and the escape of large amounts of the refrigerant at the time the automobile is junked can be prevented. The invention thus helps to prevent air pollution and protect the earth's ozone layer.

In addition, since during operation when the automobile is stopped the engine control means of the system controller controls the accelerator actuator and the accelerator actuator in turn regulates the engine speed so as to produce an amount of electric power matched to the amount of electric power consumed by the load, it is possible to obtain electric power in an amount appropriate for the size of the load. As a result, the amount of power supplied to a varying load is prevented from becoming excessive or deficient, so that highly efficient power generation can be realized.

What is claimed is:

1. An automobile ac generator system comprising:
   a generator driven by the engine of an automobile;
   a system controller for controlling the voltage and converting the frequency of ac power generated by the generator, said system controller comprising rectification means for converting the ac power generated by the generator into dc power, generator control means for detecting the voltage of the dc power rectified by the rectification means and controlling the voltage of the ac power generated by the generator on the basis of the detected voltage, an inverter for converting the dc power from the rectification means into single-phase ac power of commercial line frequency and three-phase ac power of commercial line frequency, and conversion mode control means for controlling the conversion operation of the inverter;
   control operation selection means for selecting among conversion modes of the inverter controlled by the conversion mode control means of the systems controller; and
   a battery for supplying electric power to the system controller.

2. An automobile ac generator system according to claim 1 further comprising:
   an accelerator actuator for regulating the accelerator system of the engine so as to regulate the engine speed; and
   an engine control means provided in the system controller for controlling the accelerator actuator in response to the amount of electric power consumed by the load to which electric power is being supplied.

3. An automobile ac generator system comprising:
   a generator driven by the engine of an automobile;
   temperature sensing means for detecting the temperature of the automobile interior;
   a system controller for controlling the voltage and converting the frequency of ac power generated by the generator, said system controller comprising rectification means for converting the ac power generated by the generator into dc power, generator control means for detecting the voltage of the dc power rectified by the rectification means and controlling the voltage of the ac power generated by the generator on the basis of the detected voltage, an inverter for converting the dc power from the rectification means into single-phase ac power of commercial line frequency, three-phase ac power of commercial line frequency and three-phase ac power of a voltage and a frequency which are variable in light of the temperature detected by the temperature sensing means, and conversion mode control means for controlling the conversion operation of the inverter;

control operation selection means for selecting among conversion modes of the inverter controlled by the conversion mode control means of the system controller;

a battery for supplying electric power to the system controller; and an air conditioning apparatus operated by the three-phase ac power of variable voltage and variable frequency output by the inverter of the system controller.

4. An automobile ac generator system according to claim 3 further comprising:

an accelerator actuator for regulating the accelerator system of the engine so as to regulate the engine speed; and, an engine control means provided in the system controller for controlling the accelerator actuator in response to the amount of electric power consumed by the load to which electric power is being supplied.

5. An automobile ac generator system comprising:

a single-shaft, dual-output ac generator having a stator provided with coils for low-voltage output and coils for high-voltage output, and a rotor disposed inside the stator and driven to rotate by an automobile engine, the generator providing a low-voltage output at low-voltage output terminals of the coils for low-voltage output and a high-voltage output at high-voltage output terminals of the coils for high-voltage output;

first rectification means for converting the ac powder supplied from the low-voltage output terminals of the single-shaft, dual-output ac generator into dc power;

temperature sensing means for detecting the temperature of the automobile interior;

a system controller for controlling the voltage and converting the frequency of ac power generated by the single-shaft, dual-output ac generator, said system controller comprising second rectification means for converting the ac power supplied from the high-voltage terminals of the single-shaft, dual-output ac generator into dc power, generator control means for detecting the voltages of the dc power rectified by the first rectification means and controlling the voltage of the ac power of the generator on the basis of the detected voltages, an inverter for converting the dc power from the second rectification means into single-phase ac power of commercial line frequency and three-phase ac power of a voltage and a frequency which are variable in light of the temperature detected by the temperature sensing means, and conversion mode control means for controlling the conversion operation of the inverter;

control operation selection means for selecting among conversion modes of the inverter controlled by the conversion mode control means of the systems controller;

a battery for storing the electric power generated by the single-shaft, dual-output ac generator and supplying electric power to the system controller; and an air conditioning apparatus operated by the three-phase ac power of variable voltage and variable frequency output by the inverter of the system controller.

6. An automobile ac generator system according to claim 5 further comprising:

an accelerator actuator for regulating the accelerator system of the engine so as to regulate the engine speed; and an engine control means provided in the system controller for controlling the accelerator actuator in response to the amount of electric power consumed by the load to which electric power is being supplied.

7. An automobile ac generator system comprising:

a single-shaft, dual-output ac generator having a stator provided with coils for low-voltage output and coils for high-voltage output and a rotor disposed inside the stator and driven to rotate by an automobile engine, the generator providing a low-voltage output at low-voltage output terminals o the coils for low-voltage output and a high-voltage output at high-voltage output terminals of the coils for high-voltage output;

first rectification means for converting the ac power supplied from the low-voltage output terminals of the single-shaft, dual-output ac generator into dc power;

temperature sensing means for detecting the temperature of the automobile interior;

a system controller for controlling the voltage and converting the frequency of ac power generated by the single-shaft, dual-output ac generator, said system controller comprising second rectification means for converting the ac power supplied from the high-voltage terminals of the single-shaft, dual-output ac generator into dc power, generator control means for detecting the voltages of the dc power rectified by the first rectification means and controlling the voltage of the ac power of the generator on the basis of the detected voltages, an inverter for converting the dc power from the second rectification means into three-phase ac power of commercial line frequency and three-phase ac power of a voltage and a frequency which are variable in light of the temperature detected by the temperature sensing means, and conversion mode control means for controlling the conversion operation of the inverter;

control operation selection means for selecting among conversion modes of the inverter controlled by the conversion mode control means of the systems controller;

a battery for storing the electric power generated by the single-shaft, dual-output ac generator and supplying electric power to the system controller; and an air conditioning apparatus operated by the three-phase ac power of variable voltage and variable frequency output by the inverter of the system controller.

8. An automobile ac generator system according to claim 7 further comprising:
- an accelerator actuator for regulating the accelerator system of the engine so as to regulate the engine speed; and
- an engine control means provided in the system controller for controlling the accelerator actuator in response to the amount of electric power consumed by the load to which electric power is being supplied.

9. An automobile ac generator system comprising:
- a generator driven by the engine of an automobile;
- temperature sensing means for detecting the temperature of the automobile interior;
- an air conditioning apparatus operated by three-phase ac power;
- an system controller for controlling the voltage and converting the frequency of ac power generated by the generator, said system controller comprising rectification means for converting the ac power generated by the generator into dc power, generator control means for detecting the voltage of the dc power rectified by the rectification means and controlling the voltage of the ac power of the generator on the basis of the detected voltage, an inverter for converting the dc power from the rectification means into three-phase ac power of variable voltage and variable frequency, and conversion mode control means for controlling the conversion operation of the inverter to produce a three-phase ac output of a voltage and a frequency suitable in light of the temperature detected by the temperature sensing means; and
- a battery for supplying electric power to the system controller.

10. An automobile ac generator system according to claim 9, wherein the generator is a single-shaft, dual-output ac generator whose high-voltage output is supplied to the system controller.

* * * * *